United States Patent [19]

Rogols

[11] Patent Number: 5,436,024
[45] Date of Patent: Jul. 25, 1995

[54] CRYOPROTECTED SURIMI PRODUCT

[75] Inventor: Saul Rogols, Golden, Colo.

[73] Assignee: Penwest Foods Co., Englewood, Colo.

[21] Appl. No.: 183,157

[22] Filed: Jan. 18, 1994

Related U.S. Application Data

[62] Division of Ser. No. 9,646, Jan. 27, 1993, abandoned.

[51] Int. Cl.$^6$ .................... A23L 1/314; A23L 1/325
[52] U.S. Cl. .................... 426/643; 426/644; 426/646
[58] Field of Search .................... 426/643, 646, 644

[56] References Cited

U.S. PATENT DOCUMENTS

| | | | |
|---|---|---|---|
| 3,505,110 | 4/1970 | Kesler et al. | 127/29 |
| 3,582,399 | 6/1971 | Black | 127/58 |
| 4,572,838 | 2/1986 | Lanier et al. | 426/643 |
| 4,992,295 | 2/1991 | Ueno et al. | 426/643 |
| 5,028,444 | 7/1991 | Yamamoto et al. | 426/332 |
| 5,028,445 | 7/1991 | Wu et al. | 426/574 |
| 5,110,612 | 5/1992 | Quarles et al. | 426/548 |

OTHER PUBLICATIONS

G. A. McDonald et al., "Carbohydrates as Cryoprotectants for Meats and Surimi," *Food Technology*, Mar. 1991, pp. 150, 152–154, 156, 158–159.
J. W. Park et al., "Use of Cryoprotectants to Stabilize Functional Properties of Prerigor Salted Beef During Frozen Storage," *J. Food Science*, 52(3) (1987), pp. 537–542.
J. W. Park et al., "Cryoprotective Effects of Sugar, Polyols, and/or Phosphateson Alaska Pollack Surimi," *J. Food Science*, 53(1) (1988), pp. 1–3.
J. W. Park et al., "Effects of Cryoprotectants in Minimizing Physiochemical Changes in Bovine Natural Actomysin During Frozen Storage," *Journal of Food Biochemistry*, 11 (1987), pp. 143–161.
T. C. Lanier, "Functional Properties of Surimi," *Food Technology*, 40(3) (1986), pp. 107–114 and 124.
J. Mans, "Kyrotaru's Bridge Across the Pacific," *Prepared Foods*, Nov., 1992, pp. 85–86 and 88.
*The Food Industry Newsletter*, vol. 21, No. 15 (Sep. 8, 1992).
*Seafood Business*, vol. 10, No. 7 (Nov./Dec., 1991), pp. 37–41. Cryo–dex TM Product Information Bulletin (1993).

*Primary Examiner*—Arthur L. Corbin
*Attorney, Agent, or Firm*—Marshall, O'Toole, Gerstein, Murray & Borun

[57] ABSTRACT

A surimi product comprising a surimi, and a hydroxypropyl starch hydrolyzate product, a spherical dextrose product, or a mixture thereof as a cryoprotectant, is disclosed. The cryoprotectant is present in a sufficient amount to prevent significant freeze-induced denaturation of proteins during storage of the surimi product, and to thereby maintain protein functionality to allow use of the surimi product in the manufacture of foodstuffs.

8 Claims, 3 Drawing Sheets

CRYOPROTECTED SURIMI PRODUCT

CROSS-REFERENCE TO RELATED APPLICATION

This application is a divisional of U.S. patent application Ser. No. 08/009,646, filed Jan. 27, 1993, now abandoned.

FIELD OF THE INVENTION

The present invention relates to a method of preventing significant freeze-induced denaturation of proteins in a surimi product during storage. More particularly, the present invention relates to a surimi product comprising a surimi and a sufficient amount of a hydroxypropyl starch hydrolyzate product, a spherical dextrose product, or a mixture thereof, as a cryoprotectant to prevent significant denaturation of proteins during storage at freezing temperatures and thereby maintain protein functionality. After thawing, a cryoprotected surimi product demonstrates sufficient functionality for use in the manufacture of foodstuffs.

BACKGROUND OF THE INVENTION

Surimi is a generic term for minced fish that has been processed to remove bones, fish oil and fish flavor. Typically, surimi is prepared by the fresh water leaching of mechanically deboned fish muscle. The leached muscle, after dewatering, yields a light-colored, bland proteinaceous material comprising essentially myofibrillar (contractile) protein, or surimi.

Conventionally, surimi is produced from fish, such as Alaskan pollack, however surimi derived from poultry, pork and beef also are known. With respect to fish, surimi can be prepared at sea or on shore. After production, surimi usually is frozen into blocks, typically about 20 kilograms in weight, and is stored for periods of weeks to months at freezing temperatures before use.

Frozen surimi is an intermediate protein source used to produce various foodstuffs, such as, for example, imitation crab legs, imitation scallops, kamaboko (fish jelly) and imitation lobster. To produce a surimi-based foodstuff, the bland-tasting surimi first is thawed, then salt is added to the thawed surimi during comminution of the surimi to a paste. The salt solubilizes the myofibrillar protein. Next, starch, non-muscle proteins (e.g., egg white, soy, whey), flavorings and colorants are added to the surimi paste. The resulting paste is formed into a desired shape (e.g., a crab leg), then heated to produce any of a range of foodstuff shapes and textures. The amount of surimi in such foodstuffs can range from 20% to 80% by weight of the foodstuff.

Fish species harvested to produce surimi often are available only far from shore and only during a short harvesting period. By necessity therefore, some surimi is prepared at sea, and is frozen on shipboard to preclude spoilage before use. A majority of the surimi that is processed on shore is also frozen because most fish species are harvested during a short harvesting period, but the demand for surimi is constant throughout the year. Therefore, a sufficient amount of surimi produced on shore or at sea must be frozen to accommodate this year long demand.

As previously stated, surimi comprises essentially myofibrillar proteins. Fish myofibrillar proteins are very susceptible to freeze-induced denaturation. Similar myofibrillar proteins derived from beef, pork and poultry also are subject to freeze-induced denaturation, but to a lesser extent than fish myofibrillar proteins. To overcome this susceptibility to protein denaturation, the refined myofibrillar component of fish muscle, i.e., surimi, is admixed with a cryoprotectant prior to freezing the surimi. A cryoprotectant is a chemical compound, or combination of compounds, that prevents significant protein denaturation and therefore imparts long-term storage stability to the frozen surimi. This long-term storage stability in turn ensures good protein functionality to allow use of the surimi in the manufacture of foodstuffs.

The term "functionality" refers to the specific attributes a food processor considers in adopting a protein source, like surimi, for use in a foodstuff. Functionality often is measured in terms of: (1) water binding ability to control water loss during storage, increased cook yield and increased juiciness; (2) fat binding ability to prevent fat separation during cooking; (3) texture; (4) gelation temperature and strength; (5) impact on appearance; and (6) impact on flavor and odor. As will be demonstrated in more detail hereinafter, functionality can be expressed quantitatively as gel-forming potential, which is manifested physically as texture formation and water-binding ability.

In the absence of a cryoprotectant, a surimi stored at freezing temperatures for extended periods has a decreased functionality. The freezing process causes ice crystal formation which results in dehydration of the myofibrillar protein, a pH decrease, and a change in salt concentration. These three effects, in addition to various hydrophobic interactions, denature and/or aggregate the frozen myofibrillar protein of surimi. In addition, the longer the surimi is frozen, the greater is the degree of protein denaturation.

Therefore, a cryoprotectant is added to the surimi to protect frozen surimi from a loss in functionality due to protein denaturing. A cryoprotectant must be intimately associated with the protein molecules to prevent denaturing. Therefore, cryoprotectants are useful in a minced product, like surimi, and are incorporated into the minced product before the product is frozen.

A cryoprotectant used to prevent significant denaturation of proteins in frozen surimi preferably meets several criteria. It is especially important for a cryoprotectant to maintain protein functionality during extended frozen storage of surimi, and thereby allow use of the surimi in the manufacture of foodstuffs. It is also desired that a cryoprotectant be relatively inexpensive, readily available, nontoxic, low in taste, water soluble, have good functional effects, and not appreciably brown the surimi during a cooking or heating process. Various proposed cryoprotectants have not met with commercial success because of their failure to meet one or more of these criteria. Such materials include: carbohydrate compounds, like mono- and di-saccharides; sugar alcohols; low molecular weight polyols; amino acids; carboxylic acids; triglycerides; hydrogenated glucose syrups; surfactants, such as polyoxyethylene sorbitan esters and sucrose esters; and quaternary amines. Other cryoprotectants and mechanisms of cryoprotection are discussed in G. A. McDonald et al., "Carbohydrates as Cryoprotectants for Meats and Surimi", *Food Technology*, March, 1991, pp. 150, 152–154, 156, and 158–159.

Presently, the standard, most widely used cryoprotectants for surimi are sucrose and sorbitol, either alone or in combination. In addition, a relatively small amount of a polyphosphate, such as sodium tripolyphosphate, is conventionally added to the surimi as a synergist to increase the cryoprotective effect of sucrose and/or sorbitol. Sucrose and sorbitol are the cryoprotectants of choice for surimi, and especially for Alaskan pollack surimi, because these cryoprotectants are readily available, relatively economical, and importantly, have a low tendency to cause Maillard browning when a surimi-based foodstuff is cooked or otherwise heated. Maillard browning is the well-known result of a reaction between a reducing sugar and a protein to produce brown pigments. A cryoprotectant that effectively resists browning the surimi is very important with respect to the bright white kamaboko products commonly served by the Japanese, the largest consumers of surimi.

Sucrose and sorbitol, however, add a definite sweet taste to surimi. Sucrose alone is a useful cryoprotectant but imparts too sweet of a taste to surimi. Therefore, sucrose usually is combined with sorbitol, in about a 1:1 weight ratio, and the mixture is used as a cryoprotectant for surimi. The sucrose-sorbitol mixture still imparts a perceptible sweet taste to surimi which is objectionable in many surimi-based foodstuffs. Therefore, it would be useful to provide a cryoprotectant: (1) that maintains the functionality of proteins in frozen surimi at least as well as sucrose and sorbitol, (2) that has a low tendency to cause Maillard browning during storage of surimi at freezing temperatures and during heating of a surimi-based foodstuff, and (3) that also possesses a low degree of taste.

In addition to sucrose and sorbitol, other specific cryoprotectants added to surimi include lactitol, maltose, fructose, lactose, mannitol, xylitol, lactilose, isomalt, maltitol, maltodextrin and various edible gums. Another cryoprotectant for surimi is polydextrose, a polymerized glucose which is a nonsweet, low calorie hydrolyzed starch bulking agent disclosed in Lanier et al. U.S. Pat. No. 4,572,838, and usually is used in combination with sorbitol. Yamamoto et al. U.S. Pat. No. 5,028,444 also discloses a composition consisting essentially of sodium bicarbonate, calcium citrate and calcium lactate that can be added to surimi, prior to freezing and in addition to a cryoprotectant, to improve the functionality of the frozen surimi.

Dextrose, in its conventional form of flat platelets, has also been used as a cryoprotectant for surimi in an attempt to reduce the sweetness imparted to surimi by sucrose. Dextrose, however, is also a reducing sugar and contributes to Maillard browning during cooking or heating of a surimi-based foodstuff. Therefore, reducing sugars are considered unsuitable cryoprotectants for a surimi that is processed into a light or white-colored foodstuff.

Because cryoprotectants currently added to a surimi either impart an objectionable sweet taste and/or significantly contribute to Maillard browning of the surimi-based foodstuff, there exists a need for an improved cryoprotectant that maintains the functionality of proteins in a frozen surimi, does not contribute significantly to Maillard browning during storage at freezing temperatures and during heating, and is bland in taste. The present invention is directed to cryoprotectants that provide a surimi having good functionality, that resist Maillard browning and that have a bland taste.

SUMMARY OF THE INVENTION

The present invention is directed to surimi products comprising a surimi and a cryoprotectant. The cryoprotectant is present in an amount sufficient to prevent significant denaturation of the myofibrillar proteins in a surimi. In accordance with an important aspect of the present invention, the cryoprotectants of the invention do not impart an objectionable sweet taste to a surimi, and do not significantly contribute to Maillard browning of a surimi or a surimi-based foodstuff during storage at freezing temperatures. Moreover, one of the cryoprotectant materials of the invention significantly resists Maillard browning of surimi and surimi-based foodstuffs even during cooking.

In particular, the surimi product comprises: (a) a surimi, and (b) a sufficient amount of a hydroxypropyl starch hydrolyzate product, a spherical dextrose product, or a mixture thereof to cryoprotect the surimi, and thereby maintain the functionality of the proteins in the surimi after extended storage at freezing temperatures. A hydroxypropyl starch hydrolyzate product does not impart an objectionable sweet taste to the surimi and does not contribute significantly to Maillard browning of the surimi, or a surimi-based foodstuff, during a heating or cooking process.

More particularly, the present invention is directed to a surimi product comprising a surimi and from about 4% to about 12%, based on the weight of the surimi, of a hydroxypropyl starch hydrolyzate product. A preferred hydroxypropyl starch hydrolyzate product has a dextrose equivalent (DE) of from about 1 to about 45, and is prepared by the controlled hydrolysis of hydroxypropylated starch. Even more preferably, the hydroxypropyl starch hydrolyzate product has a DE of from about 5 to about 35.

Another important aspect of the present invention is to provide a surimi product comprising a surimi and from about 4% to about 12%, based on the weight of the surimi, of a spherical dextrose product. Dextrose previously was incorporated into a surimi as a cryoprotectant in the form of flat platelets. The spherical form of dextrose utilized in the present invention imparts excellent cryoprotection to surimi, and surprisingly, does not significantly contribute to Maillard browning during storage of surimi at freezing temperatures. A preferred dextrose product is a spherical form of dextrose having an average particle size diameter of about 100 to about 1000 microns ($\mu$m), and a range of particle size diameters of about 50 to about 3000 $\mu$m.

In accordance with another important aspect of the present invention, a hydroxypropyl starch hydrolyzate product or a spherical dextrose product can be used alone, or in combination, to cryoprotect a surimi. The hydroxypropyl starch hydrolyzate product and/or spherical dextrose product also can be incorporated into the surimi with traditional cryoprotectants, like sucrose or sorbitol, and synergists, like polyphosphates.

Surimi products produced according to the invention are characterized by sufficient protein functionality such that, after extended storage at freezing temperatures, the surimi product can be used in the manufacture of foodstuffs, like fabricated seafood products. Such products demonstrate an excellent functionality, e.g., an excellent ability to form gels after extended storage at freezing temperatures and subsequent thawing and processing. Protein gelation is the primary indicator of protein muscle functionality. The denaturation and degradation of fish proteins reduces gelation ability, and thereby reduces protein functionality. Accordingly, surimi products of the present invention can effectively bind water, fat and other foodstuff ingredients, and thereby provide a foodstuff having a palatable texture.

Surimi products of the present invention therefore can be processed into palatable foodstuffs.

BRIEF DESCRIPTION OF THE FIGURES

The above and other aspects and advantages of the present invention will become apparent from the following detailed description of the preferred embodiments of present invention taken in conjunction with the drawings, wherein.

DETAILED DESCRIPTION OF THE PREFERRED EMBODIMENTS

Surimi is the frozen concentrate of animal muscle tissue. Surimi typically is prepared from fish (fish surimi), and is used in the manufacture of foodstuffs like imitation crab, imitation scallops, imitation lobster and kamaboko. Surimi is also prepared from poultry (poultry surimi), pork (pork surimi) and beef (beef surimi).

Presently, the volume of surimi prepared from poultry, beef and pork is small compared to the volume of surimi prepared from fish. Accordingly, the tests described hereinafter were performed on fish surimi, and particularly, surimi prepared from Alaskan pollack. In addition, the myofibrillar proteins comprising fish surimi are less stable than similar proteins comprising mammalian and arian surimi, and accordingly fish surimi is more susceptible to freeze-induced protein denaturation. Therefore, it is envisioned that the cryoprotectants useful in the present invention can be used in a surimi product derived from fish, as well as a surimi derived from mammalian and arian sources such as poultry, pork and beef. In particular, the cryoprotectants of the present invention can be used to prevent significant protein degradation in processed meat products. Such products include but are not limited to sausage, bologna, and hamburger wherein the processed meat is comminuted and mixed with cereals and other fillers.

In addition, although the tests described hereinafter are directed to a fish surimi derived from Alaskan pollack, a hydroxypropyl starch hydrolyzate product or a spherical dextrose product, alone or in combination with each other or another cryoprotectant, also can be used to cryoprotect a surimi derived from other fish species. Surimi derived from Alaskan pollack presently is the largest volume fish surimi product and the economically most important. However, as supplies of Alaskan pollack become depleted and as other suitable fish species for surimi are accepted by consumers, the volume of surimi derived from fish other than Alaskan pollack is expected to increase. Nonlimiting examples of fish surimi that can be cryoprotected by a hydroxypropyl starch hydrolyzate product or a spherical dextrose product include surimi derived from Alaskan pollack, Pacific whiting, Atlantic menhaden, atka, flat fish, cod, Soviet pollack, jack mackerel, Argentine hake, arrowtooth flounder, pink salmon, and sand trout.

Therefore, in accordance with the present invention, a surimi, and especially a surimi derived from fish, is cryoprotected by incorporating a sufficient amount of (1) a hydroxypropyl starch hydrolyzate product or (2) a spherical dextrose product into the surimi, prior to freezing, to protect the surimi from freeze-induced protein denaturation. A cryoprotectant utilized in the present invention, i.e., a hydroxypropyl starch hydrolyzate product or a spherical dextrose product, is admixed with the surimi in an amount of from about 4% to about 12% by weight of the surimi. Preferably, a cryoprotectant is admixed with the surimi in an amount of from about 6% to about 10% by weight of the surimi.

A hydroxypropyl starch hydrolyzate product useful as a cryoprotectant is prepared by hydrolyzing the reaction product of propylene oxide and starch. The preparation of a hydroxypropyl starch hydrolyzate product useful as a cryoprotectant for surimi is disclosed in Kesler et al. U.S. Pat. No. 3,505,110, Quarles et al. U.S. Pat. No. 5,110,612, and co-owned and co-pending Quarles et al. U.S. application Ser. No. 07/878,826, filed May 5, 1992, each incorporated herein by reference.

Kesler et al. U.S. Pat. No. 3,505,110 discloses low calorie sugar products prepared by hydrolyzing hydroxypropylated starch. The hydrolysis products principally comprise glucose and hydroxypropylated polysaccharides and include little or no (preferably less than 0.5%) maltose.

Quarles et al. U.S. Pat. No. 5,110,612 discloses preferred hydrolyzate products of hydroxypropylated starch that comprise greater than about 15% by weight DP 2–6 hydrolyzate polymers and have a DE value of about 20 to about 45. These hydrolyzate products have bulking agent properties similar to those of sucrose in baked goods and other types of food products.

The hydroxypropyl starch hydrolyzate products disclosed by Quarles et al. have a bitter off-flavor which can render these hydrolysis products undesirable for particular food applications. The bitter off-flavor is attributed to hydrolysis products of hydroxypropyl starch hydrolysis products having molecular weights of about 200 to about 350 daltons (i.e., roughly between the molecular weights of glucose (180) and maltose (342)) and are theorized to be one or more isomers of mono-, di- or tri-hydroxypropyl glucose. However, as will be demonstrated hereinafter, the bitter off-flavor of these hydrolysis products does not adversely affect a fish surimi because the bland, slightly fishy taste of the surimi masks the bitter flavor of the hydroxypropyl starch hydrolyzate product. Quarles et al. copending U.S. application Ser. No. 07/878,826 discloses hydroxypropyl starch hydrolyzate product having a reduced bitter off-flavor.

Preferred hydroxypropyl starch hydrolyzate products for use in the invention include those disclosed by Kesler et al., which have a DE of about 1 or greater, and are not too sweet tasting. Such products do not impart an objectionable sweet taste to a surimi product, and therefore overcome a disadvantage associated with traditional cryoprotectants, like sucrose.

Most preferred are hydroxypropyl starch hydrolyzate products prepared according to the method disclosed in Quarles et al. U.S. Pat. No. 5,110,162. Such hydroxypropyl starch hydrolyzate products are characterized by DE values of from about 10 to about 45, and a sufficient amount of DP 1 monomers and DP 2–6 hydroxypropyl starch hydrolyzate products to provide a hydroxypropyl starch hydrolyzate product that sufficiently cryoprotects frozen myofibrillar protein and does not impart an objectionable taste to the surimi, either too sweet or too bitter. Most preferred is a hydroxypropyl starch hydrolyzate product characterized by a DE of about 15 to about 30 and which also has a DP 2–6 of about 15% to about 25% by weight, and a DP 1 of up to about 10% by weight.

In accordance with another embodiment of the present invention, a spherical dextrose product also can be used to effectively cryoprotect a surimi. Dextrose, in its conventional form as flat platelets, has been used previously to cryoprotect surimi, but significantly contributes to Maillard browning during storage of a surimi at freezing temperatures. For many foodstuffs, Maillard browning is undesirable, or unacceptable, because the consumer prefers, or demands, a white food product.

A spherical dextrose product not only cryoprotects a surimi, but in contrast to conventional dextrose products the surimi product also resists Maillard browning during storage at freezing temperatures. It is theorized, but not relied upon herein, that a spherical form of dextrose has a better solubility and a greater ability to penetrate the surimi and intimately contact the myofibrillar proteins than does dextrose in its conventional form. In contrast, conventional dextrose products previously used as surimi cryoprotectants are flat, or planar, forms of dextrose that had a tendency to remain on the surface of the surimi. The conventional planar forms of dextrose impart an unacceptable brown color to a surimi during storage at freezing temperatures. Unexpectedly, a spherical dextrose product does not significantly contribute to the Maillard browning of a surimi during storage at freezing temperatures.

In particular, a preferred spherical dextrose product useful as a cryoprotectant for surimi has an average particle size diameter of about 100 to about 1000 μm, and most advantageously about 150 to about 750 μm; and a range of particle size diameters of about 50 to about 3000 μm, and most advantageously about 100 to about 1000 μm. A spherical dextrose product having an average particle size diameter of about 200 to about 400 μm, and a range of particle size diameters of about 150 to about 500 μm is sold under the tradename CRYO-DEX ™, available from Penwest Foods, Englewood, Colo. CRYO-DEX ™ is a spray dried spherical dextrose product including at least 99.5% by weight dextrose.

Conventional forms of dextrose comprise granules of which at least 80% by weight pass through a 60 mesh sieve. In contrast, CRYO-DEX ™ spherical dextrose comprises cocrystallized spherical dextrose granules wherein essentially no granules are retained on a 12 mesh sieve, and greater than 50% by weight of the granules are retained on a 60 mesh sieve, or alternatively stated, are greater than 250 microns (μm) in diameter. TABLE I compares the sieve analysis for CRYO-DEX ™ spherical dextrose to a conventional dextrose product. In addition, a 20% by weight aqueous solution of CRYO-DEX ™ has a transmittance at 350 μm wavelength of at least 80%, and has a pH of about 3.5 to about 5.5.

TABLE I

| Product | Sieve Analysis | | | | |
|---|---|---|---|---|---|
| | on 20 | on 40 | on 60 | on 100 | through 100 |
| CRYO-DEX ™ | 0.2 | 12.0 | 47.6 | 31.2 | 9.0 |
| Commercial Dextrose | 0.5 | 2.6 | 11.7 | 46.5 | 38.7 |

A hydroxypropyl starch hydrolyzate product, a spherical dextrose product, or a mixture thereof, can be admixed with a surimi, prior to freezing, to protect the surimi from freeze-induced protein degradation. A hydroxypropyl starch hydrolyzate product or a spherical dextrose product also can be used in conjunction with conventional cryoprotectants, such a sucrose or sorbitol, to cryoprotect a surimi. The inclusion of a polyphosphate, like sodium tripolyphosphate, tetrasodium pyrophosphate or tetrapotassium pyrophosphate, as a synergist for the cryoprotectants, does not adversely affect the hydroxypropyl starch hydrolyzate product or the spherical dextrose product.

The total amount of cryoprotectant added to a surimi is generally from about 4% to about 12% by weight of the surimi. Preferably, the total amount of cryoprotectant added to the surimi is from about 6% to about 10% by weight of the surimi. A polyphosphate synergist is included in an amount of up to about 1% by weight of the surimi.

To demonstrate the usefulness of the present invention, a hydroxypropyl starch hydrolyzate product or a spherical dextrose product was incorporated into a fish surimi and tested for: (1) an ability to cryoprotect frozen surimi, (2) an ability to maintain the functionality of proteins in surimi that has been stored below freezing temperatures, (3) an ability to resist Maillard browning during storage at freezing temperatures or during a heating process, and (4) an ability to avoid imparting a sweet or an off-taste to the surimi or a surimi-based foodstuff.

In the tests described hereinafter the hydrolyzed hydroxypropyl starch hydrolyzate product utilized as a cryoprotectant was prepared in accordance with the methods disclosed in Quarles et al. U.S. Pat. No. 5,110,612 and had a DE of about 24.4, a DP 2–6 of about 17.8% by weight and a DP 1 of about 9.6% by weight. The spherical dextrose product utilized as a cryoprotectant was CRYO-DEX ™, a spherical dextrose having an average particle size diameter of about 200 to about 400 μm, and available from Penwest Foods Co., Englewood, Colo.

EXAMPLE 1

In this example, the ability of a hydroxypropyl starch hydrolyzate product or a spherical dextrose product to cryoprotect a surimi was compared to the ability of sucrose, an industry standard, to cryoprotect a surimi. In the first of these comparative tests, a model fish protein (actomyosin) was frozen and thawed under controlled conditions to determine the effectiveness of a hydroxypropyl starch hydrolyzate product or a spherical dextrose product as a cryoprotectant. In this comparative test, $Ca^{+2}$-ATPase activity was determined after freezing and thawing a test sample. It is known to those skilled in the art that $Ca^{+2}$-ATPase activity correlates well with protein functionality in a surimi, i.e., that a high $Ca^{+2}$-ATPase activity indicates good protein functionality.

Figure 1:
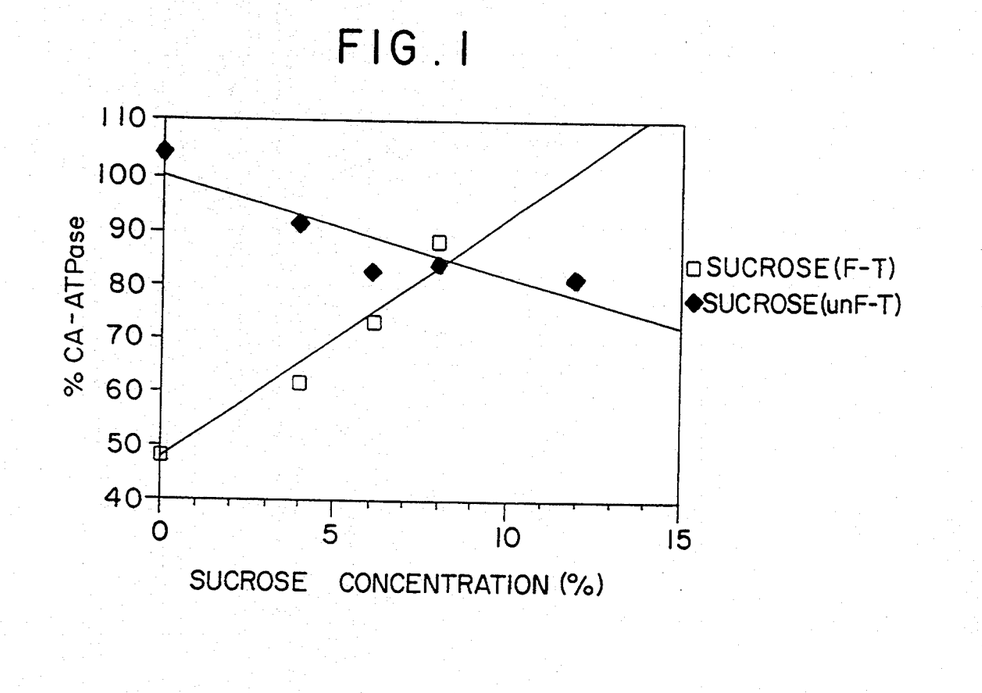
FIGS. 1–3 are plots of % $Ca^{+2}$-ATPase activity vs. weight percent of cryoprotectant, based on the weight of surimi, for unfrozen surimi and for surimi subjected to freeze-thaw (F–T) cycles.
Figure 2:
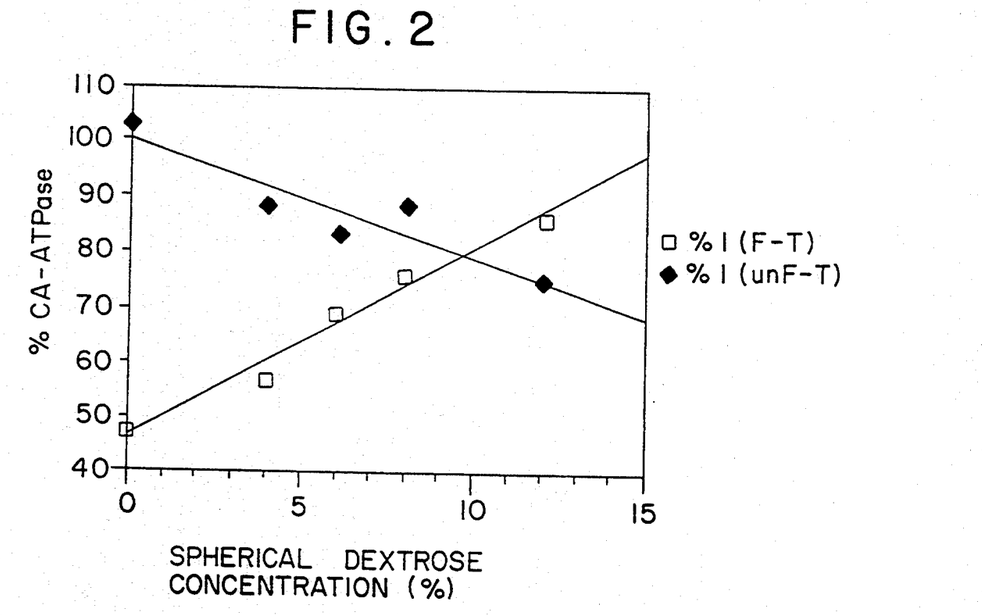
Figure 3:
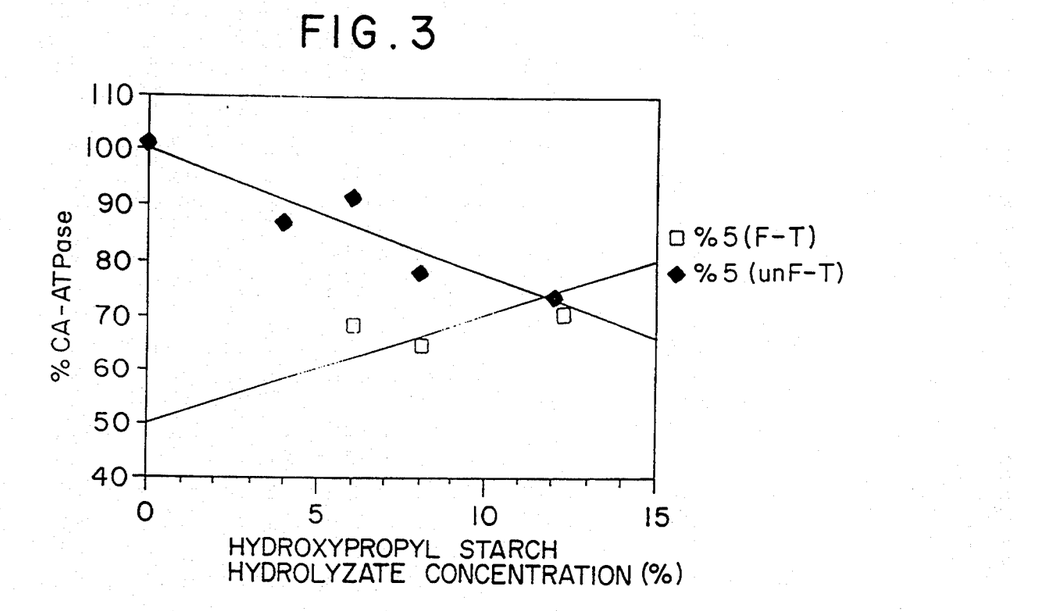

The results of these comparative tests are illustrated in the plots of FIGS. 1 through 3. In each of FIGS. 1 through 3, the ordinate (Y-axis) plots the % $Ca^{+2}$-ATPase activity of the fish protein and the abscissa (x-axis) plots the percentage by weight of cryoprotectant incorporated into the surimi. In each of FIGS. 1 through 3, the % $Ca^{+2}$-ATPase decreases with an increasing concentration of cryoprotectant for unfrozen (unF–T) surimi samples. This decrease is an artifact that indicates a decreased $Ca^{+2}$-ATPase activity, but is not related to actual protein denaturation.

With respect to FIG. 1, sucrose, the industry standard, exhibits good cryoprotectancy as demonstrated by the increasing % $Ca^{+2}$-ATPase activity for surimi samples that include an increasing amount of sucrose and that have been subjected to a freeze-thaw cycle (F–T). FIGS. 2 and 3 similarly demonstrate an increase in % $Ca^{+}$-ATPase activity for a surimi sample cryoprotected with either a spherical dextrose product or a hydroxypropyl starch hydrolyzate product, respectively. Both FIGS. 2 and 3 illustrate a direct relationship between % $Ca^{+2}$-ATPase and weight percent of cryoprotectant, thereby showing that, like sucrose, a spherical dextrose product or a hydroxypropyl starch hydrolyzate product effectively cryoprotect fish protein against freeze-induced denaturation.

The slope of the F–T (freeze-thaw) plot of FIG. 1 (sucrose), a well known cryoprotectant, approximates the slope of the F–T plot in FIGS. 2 and 3, thereby indicating to a person skilled in the art that sucrose, a hydroxypropyl starch hydrolyzate product, and a spherical dextrose product are effective cryoprotectants. However, it also is known to those skilled in the art that sucrose imparts too sweet of a taste to a surimi and to foodstuffs derived therefrom, and therefore cannot be used at high levels. Conventionally, sucrose is used at a level of about 4% by weight of the surimi, in conjunction with sorbitol, as a cryoprotectant. The cryoprotectants utilized in the present invention do not possess the disadvantage of relatively unacceptable sweetness and therefore can be used at high levels without the need to incorporate sorbitol to reduce sweetness. A spherical dextrose product is lower in sweetness compared to sucrose and therefore helps overcome the sweetness problem associated with sucrose. A hydroxypropyl starch hydrolyzate product has essentially no sweetness, and its slight bitter off-taste is masked by the bland taste of surimi.

EXAMPLE 2

In this example, a set of tests compared the gelling properties of a hydroxypropyl starch hydrolyzate product to sucrose. Protein gelation, as measured by gel-forming ability, is a primary indicator of muscle protein functionality. The most informative method for both measuring and specifying the gel-forming properties of fish protein, and other proteins as well, is through a torsional measurement of both: (1) the strain to gel failure and (2) the rigidity (calculated from stress and strain to failure measurements) of heat-induced gels prepared by standardized procedures. The plotting of these torsional measurements (shear stress v. shear strain) reveals the general sensory properties of the gel. The stress and strain tests are fully explained in J. W. Park et al., *J. Food Sci.*, 52(3), (1987), pp. 537–542.

Figure 4:
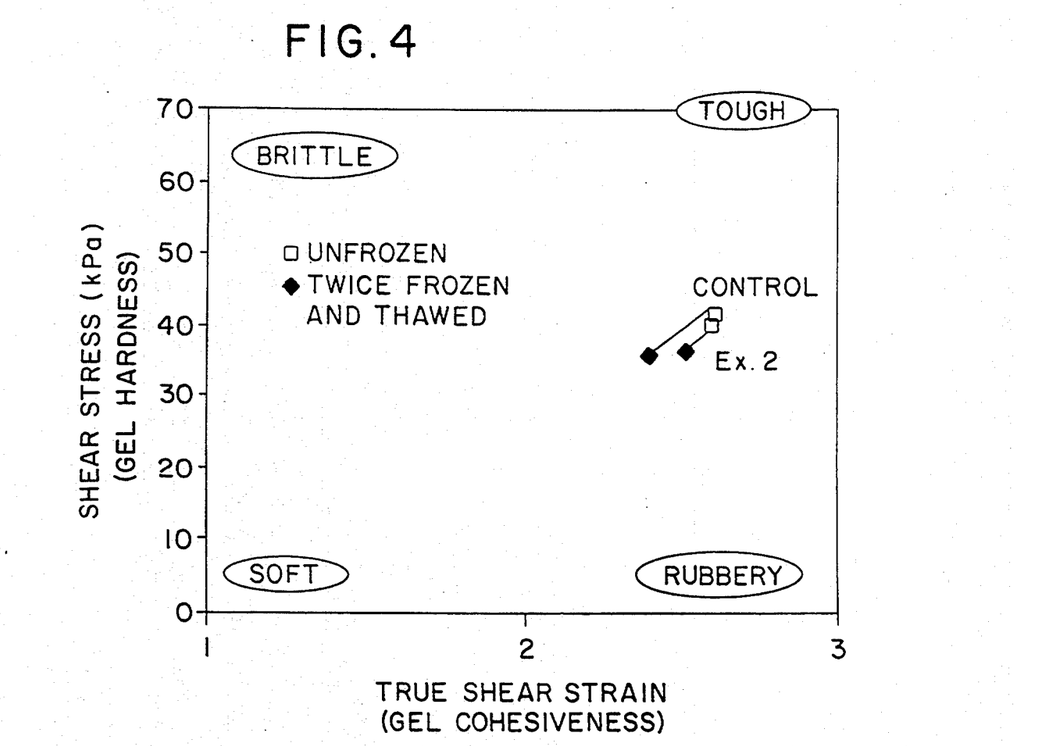
FIG. 4 is a plot of shear stress v. shear strain for unfrozen and for twice frozen and thawed surimi samples either absent a cryoprotectant or incorporating a hydroxypropyl starch hydrolyzate product.

FIG. 4 illustrates common sensory terms used to describe the texture of gels falling in the regions of the four "corners" of a shear stress v. shear strain plot. The human mouth is able to perceive, in general, the relative ratio of rigidity, or stiffness, (i.e., shear stress) to cohesiveness of a product (i.e., shear strain). A higher value for this stress to strain ratio translates into a "brittle", or friable, sensation, while a low value for the stress to strain ratio translates to a "rubbery" texture. In gels wherein a relative balance exists between the gel stress and gel strain, the overall magnitude of the two textural parameters (rigidity and cohesion) place the textural sensation on a continuum moving from a perception of "soft", or "mushy", upwards to a perception of "toughness".

FIG. 4 also illustrates the results of incorporating a hydroxypropyl starch hydrolyzate product produced according to the methods of Quarles et al. U.S. Pat. No. 5,110,612 and having a DE of about 24.4 and a DP 2–6 of about 17.8% by weight into a surimi that is used in the preparation of an imitation crabstick.

| Cryoprotected Surimi | |
|---|---|
| Surimi derived from Alaskan Pollack | 96% (by weight) |
| Hydroxypropyl Starch Hydrolyzate Product (D.E. about 24.4, D.P. 2–6 about 17.8%) | 4% (by weight) |

The results of shear stress and shear strain tests on the surimi cryoprotected with a hydroxypropyl starch hydrolyzate product were compared to stress and strain tests on a surimi that did not include a cryoprotectant (control sample). An unfrozen portion of the control surimi and of the cryoprotected surimi were each formed into an imitation crabstick by admixing the surimi with standard foodstuff ingredients. A second portion of the control surimi and the cryoprotected surimi were each twice frozen and thawed prior to admixing with standard foodstuff ingredients and shaping into an imitation crabstick. The ability of the various surimi samples to form gels was determined by measuring shear stress (gel hardness) and shear strain (gel cohesiveness) by standard procedures known to those skilled in the art.

The results of the shear stress and shear strain tests for the unfrozen and freeze-thawed surimi samples are plotted in FIG. 4. From FIG. 4, the control surimi sample (i.e., including no cryoprotectant) showed a significant decrease in gelling properties (i.e., a softer product) after the control surimi sample was twice frozen and thawed. In contrast, by adding 4% by weight of a hydroxypropyl starch hydrolyzate product to the surimi, the unfrozen cryoprotected surimi of was not adversely affected compared to the control sample (both are at the essentially identical position of the plot). In addition, the cryoprotectant utilized in the present invention prevented significant protein degradation and therefore maintained the functional properties of the surimi. The twice frozen and thawed cryoprotected surimi, which included a hydroxypropyl starch hydrolyzate product, provided a gel having significantly improved properties compared to the twice frozen and thawed control sample.

EXAMPLE 3

Figure 5:
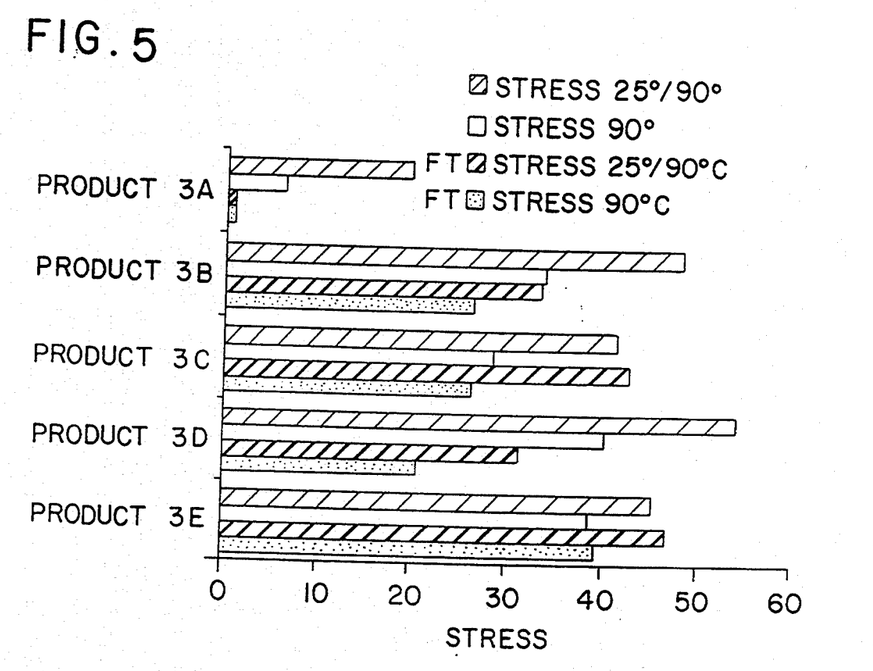
FIGS. 5 and 6 are bar graphs illustrating the gel stress and gel strain, respectively, of surimi samples either including or absent a cryoprotectant, and processed either at 25° C. and at 90° C. or only at 90° C.
Figure 6:
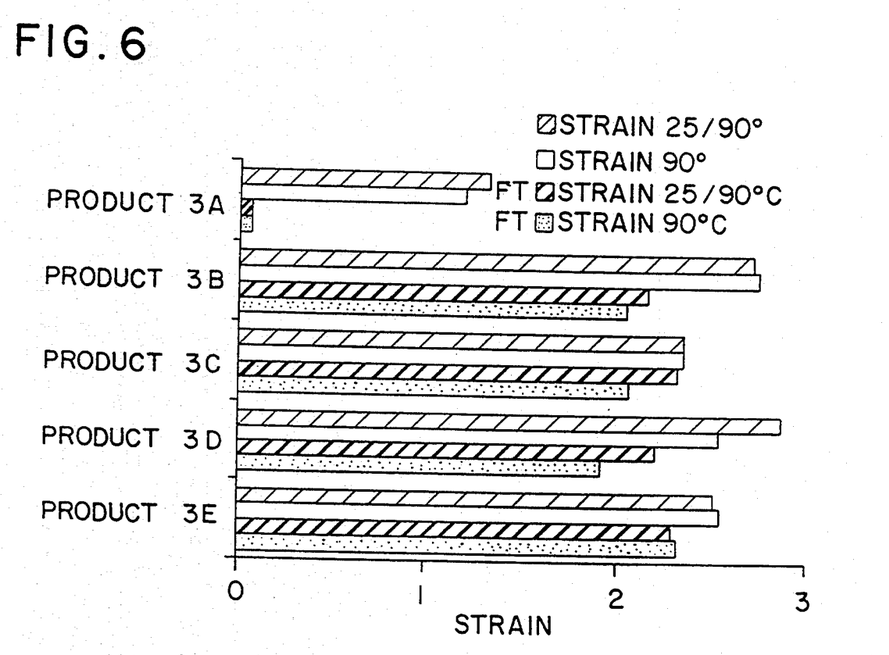

In this example, further tests were performed on surimi prepared from Alaskan pollack. FIGS. 5 and 6 illustrate the stress (gel strength) and strain (gel cohesiveness), respectively, of various surimi gels, which either include or are lacking a cryoprotectant. The strength and cohesiveness of the gels were measured by standard techniques on a Torsion Gelometer for torsional failure (twisting until breakage). The gel stress and gel strain illustrated by the bar graphs in FIGS. 5 and 6, respectively, were measured for each surimi sample after portions of the surimi sample were subjected to one of a different set of conditions. For example, a portion of each surimi sample was tested prior to freezing and a second portion of each surimi sample was tested after undergoing a freeze-thaw (FT) cycle. In this test, the frozen surimi samples were stored at −20° C. for two weeks. The gelling properties for each surimi sample also were tested after processing a portion of a surimi sample at 90° C. (a pasteurization cook) for one hour, or after preprocessing a portion of a surimi sample at 25° C. for 15 minutes followed by processing at 90° C. for one hour.

The bar graphs in FIGS. 5 and 6 therefore are derived from five different surimi samples:

Product 3A

The control sample did not include a cryoprotectant, but 4% sucrose (by weight), 4% sorbitol and 0.3% sodium triopolyphosphate was added to the control sample prior to testing and after thawing (for freeze-thawed samples) in order to use gel measurements as a measure of protein denaturation during frozen storage.

Product 3B

An Alaskan pollack surimi including 8% sorbitol, by weight, as a cryoprotectant and 0.3% sodium tripolyphosphate as a cryoprotectant synergist.

Product 3C

An Alaskan pollack surimi including 8% hydroxypropyl starch hydrolyzate product (D.E. about 24.4, D.P. 2-6 about 17.8%), by weight, as a cryoprotectant and 0.3% sodium tripolyphosphate as a cryoprotectant synergist.

Product 3D

An Alaskan pollack surimi including 4% sorbitol and 4% sucrose, by weight, as a cryoprotectant and 0.3% sodium tripolyphosphate as a cryoprotectant synergist.

Product 3E

An Alaskan pollack surimi including 8% spherical dextrose product (CRYO-DEX TM), by weight, as a cryoprotectant and 0.3% sodium tripolyphosphate as a cryoprotectant synergist.

The bar graphs of FIGS. 5 and 6 illustrate that the Product 3A control exhibited significantly poorer gel performance than any of the cryoprotected samples even after a relatively short two week storage period at freezing temperatures. This result illustrates the overall need to cryoprotect frozen surimi. For portions of the surimi samples that were not frozen, the gelling ability for the four cryoprotected samples was approximately the same. For pollack surimi, gels preset at 25° C. typically exhibit higher stress values that gels than are not preset, and exhibit strains that are very similar. These results are illustrated in FIGS. 5 and 6 as the unshaded or lightly-shaded bars.

Other portions of the surimi samples were subjected to a six cycle freeze-thaw process of 24 hours storage in a 4° C. cooler followed by 24 hours storage in a −20° C. freezer, repeated six times. This cyclical freeze-thaw process accelerates the protein denaturation process that occurs over long-term storage at freezing temperatures. FIGS. 5 and 6 illustrate that the gel strain and gel stress became unmeasurable for a surimi (Product 3A) that does not include a cryoprotectant and that is subjected to a cyclical freeze-thaw cycle. In terms of texture, the processed surimi lacking a cryoprotectant (Product 3A) was too soft and mushy to grind and test on the torsion equipment. In general, this soft, mushy surimi has a strain of less than 0.5. A high quality surimi typically exhibits a strain of about 1.7 to about 2.6 after frozen storage.

The four surimi samples including a cryoprotectant (Products 3B-3E) each provided gels having excellent gel stress and gel strain measurements. Both the hydroxypropyl starch hydrolyzate product (Product 3C) and the spherical dextrose product (Product 3E) demonstrated an ability to cryoprotect surimi at least as well as the standard cryoprotectants (e.g., sorbitol or sucrose/sorbitol, as in Products 3B and 3D, respectively, used in the industry. Both the hydroxypropyl starch hydrolyzate product and the spherical dextrose product provided cryoprotected surimi products (Products 3C and 3E, respectively) that showed essentially no change in gel stress or gel strain due to freeze-thaw cycling. The bar graphs clearly show that the stress and strain for cryoprotected surimi samples of Products 3C and 3E are essentially identical for unfrozen portions of the samples and for portions of the samples subjected to freeze-thaw cycles. In comparison, surimi samples cryoprotected with sorbitol (Product 3B), or a combination of sucrose and sorbitol (Product 3D), demonstrated a decrease in gel stress and gel strain after freeze-thaw cycling. A decrease in gel strain is indicative of a decrease in the functional qualities of the protein. Accordingly, a hydroxypropyl starch hydrolyzate product or a spherical dextrose product effectively cryoprotects fish surimi and prevents significant protein denaturation during long storage periods at freezing temperatures.

Visual and taste tests performed in conjunction with the above-described tests also demonstrated that a surimi cryoprotected with a spherical dextrose product has more clarity and sheen, and less sweetness, than a surimi cryoprotected with sucrose. A hydroxypropyl starch hydrolyzate product has essentially no sweet taste, and can have a slightly bitter off-taste. A surimi cryoprotected with a hydroxypropyl starch hydrolyzate product, however, does not have a sweet taste or a slightly bitter off-taste. The taste of the hydroxypropyl starch hydrolyzate product is masked by the natural taste of the surimi. The lack of sweetness and lack of a bitter off-taste is an advantage because no artificial taste is imparted to the surimi, and the natural flavor of surimi is preferred by a majority of consumers.

In addition to use as a cryoprotectant, a hydroxypropyl starch hydrolyzate product or a spherical dextrose product also can be used in shipboard mincing processes to preventing significant protein decomposition of unfrozen minced fish, and thereby allow further processing of the unfrozen mince on shore. The cryoprotectants utilized in the present invention also can be used to protect beef, pork or poultry surimi, or processed meats, from significant protein denaturation during long storage periods at freezing temperatures.

Obviously, many modifications and variations of the invention as hereinbefore set forth can be made without departing from the spirit and scope thereof, and therefore only such limitations should be imposed as are indicated by the appended claims.

What is claimed is:

1. A surimi product comprising a surimi and a sufficient amount of a spherical dextrose product to cryoprotect the surimi and to maintain functionality of proteins in the surimi.

2. The surimi product of claim 1 wherein the surimi is beef surimi, pork surimi, poultry surimi, fish surimi, or a mixture thereof.

3. The surimi product of claim 1 wherein the surimi is fish surimi.

4. The surimi product of claim 1 wherein the spherical dextrose product is present in an amount of from about 4% to about 12% by weight of the surimi.

5. The surimi product of claim 1 wherein the spherical dextrose product has an average particle size of from about 100 to about 1000 $\mu$m.

6. The surimi product of claim 1 wherein the spherical dextrose product has a range of particle size diameters of from about 50 to about 3000 $\mu$m.

7. The surimi product of claim 1 wherein the spherical dextrose product comprises greater than 50% by weight spherical granules having a diameter greater than 250 microns.

8. The surimi product of claim 1 further comprising a polyphosphate as a synergist for the spherical dextrose product.

* * * * *

UNITED STATES PATENT AND TRADEMARK OFFICE
CERTIFICATE OF CORRECTION

PATENT NO. : 5,436,024
DATED : July 25, 1995
INVENTOR : SAUL ROGOLS

It is certified that error appears in the above-identified patent and that said Letters Patent is hereby corrected as shown below:

Column 5, line 39, "and arian" should be --and avian--.

Column 5, line 44, "arian sources" should be --avian sources--.

Column 8, line 62, "It-is" should be --It is--.

Column 11, line 23, "triopolyphosphate" should be --tripolyphosphate--.

Signed and Sealed this

Nineteenth Day of March, 1996

Attest:

BRUCE LEHMAN

*Attesting Officer*  *Commissioner of Patents and Trademarks*